(12) United States Patent
Lin

(10) Patent No.: US 8,320,059 B2
(45) Date of Patent: Nov. 27, 2012

(54) LENS MODULE

(75) Inventor: Tsung-yu Lin, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 460 days.

(21) Appl. No.: 12/764,886

(22) Filed: Apr. 21, 2010

(65) Prior Publication Data

US 2011/0102901 A1   May 5, 2011

(30) Foreign Application Priority Data

Oct. 30, 2009   (CN) .......................... 2009 1 0309164

(51) Int. Cl.
*G02B 9/00* (2006.01)
*G02B 9/04* (2006.01)
*G02B 7/02* (2006.01)

(52) U.S. Cl. .................. 359/740; 359/793; 359/811

(58) Field of Classification Search .................. 359/601, 359/738, 739, 740, 793, 811
See application file for complete search history.

(56) References Cited

U.S. PATENT DOCUMENTS 7,813,058 B2 * 10/2010 Huang .......................... 359/793
* cited by examiner

*Primary Examiner* — Jack Dinh
(74) *Attorney, Agent, or Firm* — Altis Law Group, Inc.

(57) ABSTRACT

A lens module includes a lens barrel, a first lens, an opaque plate, and a second lens. The first lens includes an imaging portion and a non-imaging portion surrounding the imaging portion. The non-imaging portion defines an annular conic surface. The opaque plate is annular conic shaped and contacts with the annular conic surface. The second lens includes an imaging portion and a non-imaging portion surrounding the imaging portion. The object-side surface of the non-imaging portion of the second lens is step-like shaped and includes at least two step surfaces. A junction of two adjacent step surfaces abuts against the opaque plate.

20 Claims, 2 Drawing Sheets

LENS MODULE

BACKGROUND

1. Technical Field

The present disclosure relates to a lens module.

2. Description of Related Art

Opaque plates are used in lens modules for blocking off-axis light rays from entering the lens modules. Such an opaque plate is typically a thin, annular plate and can be assembled to the lens module via being held by a lens barrel of the lens module and sandwiched by two adjacent lenses of the lens module. However, it is precision work to make the opaque plate fit with the lenses efficiently. Often the precision is low and the quality is affected.

Therefore, it is desirable to provide a lens module which can overcome the above-mentioned problems.

BRIEF DESCRIPTION OF THE DRAWING

Many aspects of the present lens module can be better understood with reference to the accompanying drawings. The components in the drawings are not necessarily drawn to scale, the emphasis instead being placed upon clearly illustrating the principles of the present lens module. Moreover, in the drawings, like reference numerals designate corresponding parts throughout the several views, and all the views are schematic.

DETAILED DESCRIPTION

Embodiments of the present lens module will now be described in detail below and with reference to the drawings.

Figure 1:
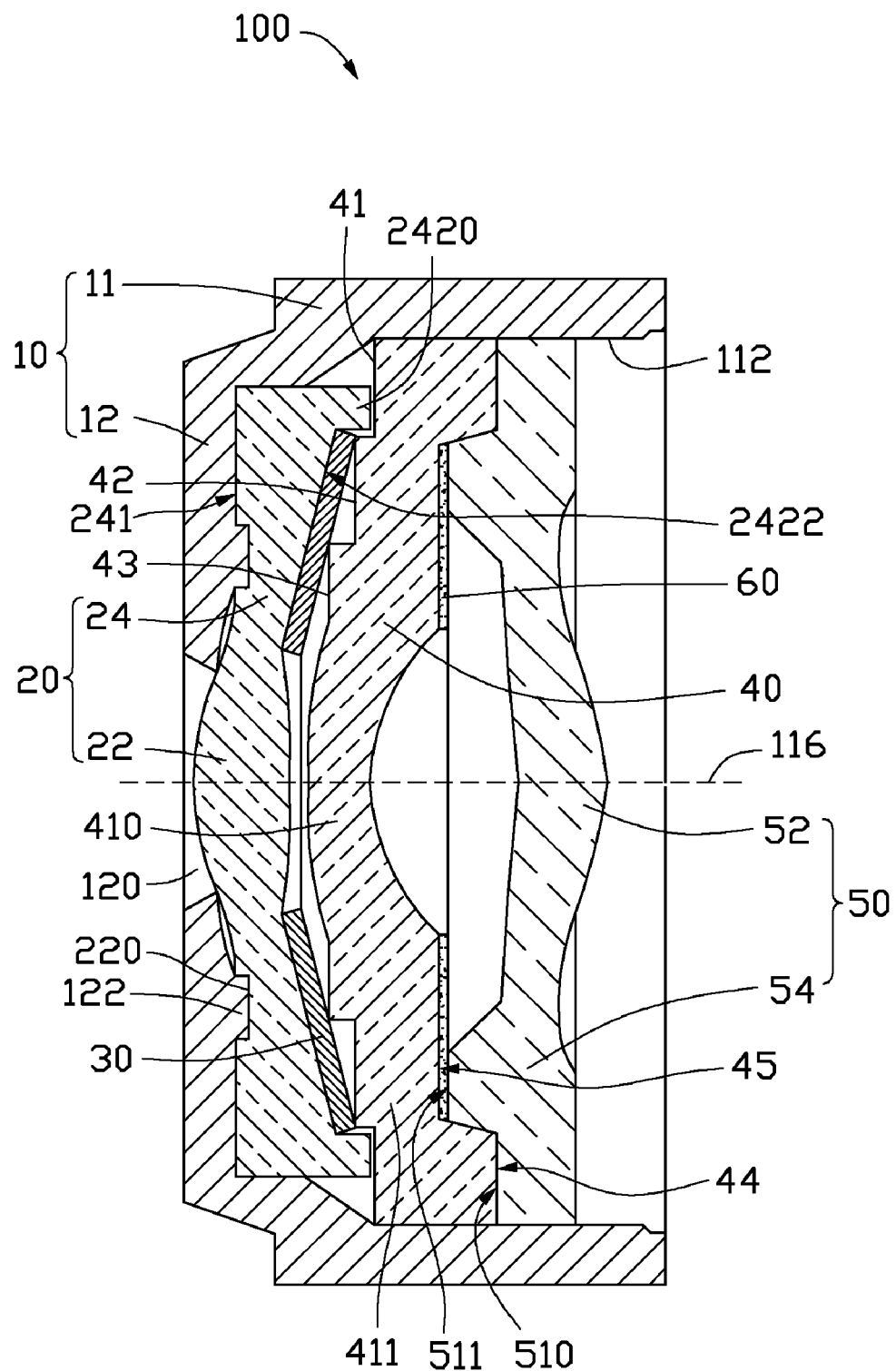
FIG. 1 is a cross-sectional, schematic view of a lens module according to an exemplary embodiment.

Referring to FIG. 1, a lens module 100, according to an exemplary embodiment, includes a lens barrel 10, a first lens 20, an annular conic opaque plate 30, a second lens 40, and a third lens 50. The first lens 20, the opaque plate 30, the second lens 40, and the third lens 50 are substantially coaxially received in the lens barrel 10 in the order from the object-side to the image-side of the lens module 100. The lens module 100 defines an imaging axis 116.

The lens barrel 10 is a hollow cylinder in shape and includes a main body 11 and an annular aperture plate 12. The annular aperture plate 12 is positioned at the object-side end of the main body 11 and is integrally formed with the main body 11. The annular aperture plate 12 defines an aperture opening 120 generally at the center thereof to allow light rays from objects of interest (not shown) to enter the lens barrel 10. The aperture opening 120 is frustoconical shaped and tapers towards the image-side of the lens barrel 10, which is beneficial for controlling the angle of incident of the light rays entering thereunto. The main body 11 includes an inner sidewall 112. The inner sidewall 112 can efficiently absorb light rays incident to improve image quality of the lens module 100. The lens barrel 10 also includes a first engaging portion 122 on the inner surface of the annular aperture plate 12. In the present embodiment, the first engaging portion 122 is a cylindrical-shaped protrusion perpendicularly protruding upward from the inner surface of the annular aperture plate 12, generally along the optical axis 116.

Figure 2:
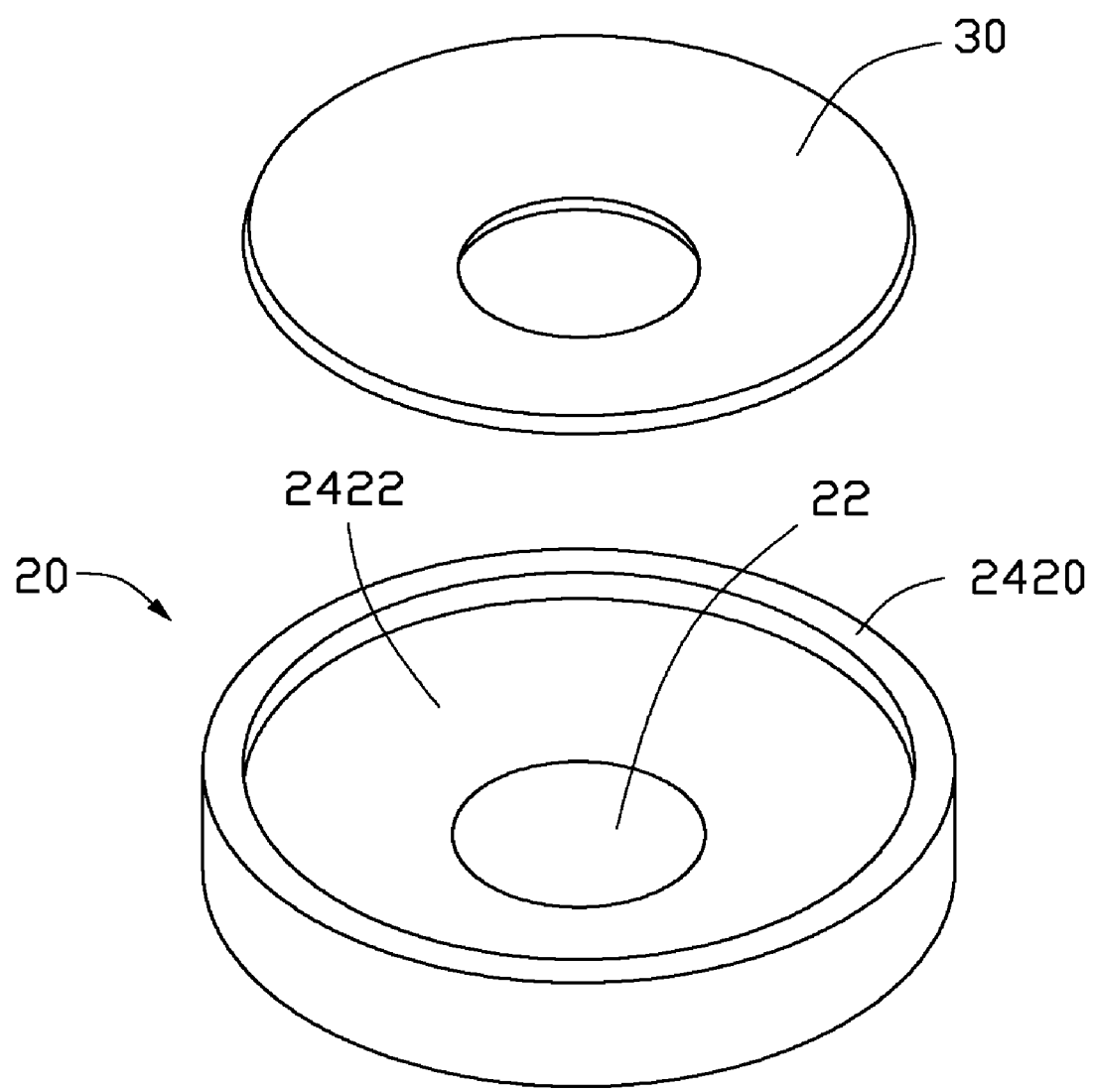
FIG. 2 is an exploded, isometric view of an annular conic opaque plate and a first lens of the lens module of FIG. 1.

Also referring to FIG. 2, the first lens 20 can be made of plastic or glass. In the present embodiment, the first lens 20 is made of plastic. The first lens 20 includes an imaging portion 22 and a non-imaging portion 24. The imaging portion 22 is convex facing toward the opening 120, and is configured for refracting light rays from an object and allowing them to pass to the second lens 40. The non-imaging portion 24 surrounds the imaging portion 22, and is configured for fixing to the inner sidewall 112 of the lens barrel 10. The first lens 20 defines a second engaging portion 220 on the object-side surface 241 of the non-imaging portion 24 of the first lens 20. In the present embodiment, the second engaging portion 220 is a cylindrical-shaped groove and corresponds to the protrusion. The protrusion of the lens barrel 10 fittingly engages with the groove respectively to hold the first lens 20 onto the inner sidewall of the annular aperture plate 12.

It is noteworthy that, in alternative embodiments, the position of the first engaging portion 122 and the second engaging portion 220 can be interchanged.

In the present embodiment, an annular flange 2420 bulges upward along the periphery of the image-side surface of the non-imaging portion 24. The image-side surface of the non-imaging portion 24 defines an annular conic surface 2422 sloping from the flange 2420 towards the object-side of the first lens 20.

The annular conic opaque plate 30 is non-reflective. The opaque plate 30 is on the annular conic surface 2422 of the first lens 20 and configured for blocking incident light rays passing through the non-imaging portion 24 from entering the lens module 100, thereby improving the image quality of the lens module 100. In the present embodiment, the opaque plate 30 is shaped to completely contact the annular conic surface 2422.

The second lens 40 can be also made of plastic or glass, and includes an imaging portion 410 and a non-imaging portion 411 surrounding the imaging portion 410. In the present embodiment, the second lens 40 is also made of plastic. The imaging portion 410 is convex facing toward the first lens 20 and can be spherical or aspherical. The imaging portion 410 is configured for refracting incident light rays. The non-imaging portion 411 is configured for fixing to the inner sidewall 112 of the lens barrel 10. The object-side surface of the non-imaging portion 411 of the second lens 40 is ladder-like shaped, and includes a first step surface 41, a second step surface 42, and a third step surface 43, all of which are substantially perpendicular to the optical axis 116. The flange 2420 of the first lens 20 abuts against the first step surface 41. The junction of the second step surface 42 and the third step surface 43, and the junction of the second step surface 42 and the first step surface 41 abut against the opaque plate 30. The image-side surface of the non-imaging portion 411 of the second lens 40 is also ladder-like shaped, and includes a fourth step surface 44 and a fifth step surface 45, all of which are substantially perpendicular to the optical axis 116.

The third lens 50 can also be made of plastic or glass, and includes an imaging portion 52 and a non-imaging portion 54. The imaging portion 52 is concave facing toward the second lens 40, and can be spherical or aspherical. The imaging portion 52 is configured for refracting light rays passing therethrough, and cooperates with the image portions 22, 410 of the first lens 20 and the second lens 40 to form the image of the object. The object-side surface of the non-imaging portion 52 of the third lens 50 is also ladder-like shaped, and includes a sixth step surface 510 and a seventh step surface 511, all of which are substantially perpendicular to the optical axis 116. The sixth step surface 510 is shaped corresponding to the fourth step surface 44, and the seventh step surface 511 is shaped corresponding to the fifth step surface 45. An adhesive layer 60 is coated between the seventh step surface 511 and the fifth step surface 45 to firmly attach the third lens 50 on the image-side surface of the non-imaging portion 411 of the second lens 40. Because, in the present embodiment, the fourth step surface 44 of the second lens 40 abuts against the sixth step surface 510 of the third lens 50 and the fifth step surface 45 of the second lens 40 abuts against the seventh step surface 511 of the third lens 50, which can improve assembly accuracy. In the present embodiment, the adhesive layer 60 is comprised of opaque materials and configured for blocking light rays passing through the non-imaging portions 24, 411, 54 of the first lens 20, the second lens 40, and the third lens 50, thereby improving image quality of the first lens 20, the second lens 30, and the third lens 50.

Compared to typical lens module, the opaque plate 30 of the lens module 100 of the present embodiment is sandwiched between the first lens 20 and the second lens 40 with the junction of the second step surface 42 and the third step surface 43 and the junction of the first step surface 41 and the second step surface 42 abutting against the opaque plate 30, thereby, omitting the gluing process. In addition, the protrusion 122 of the lens barrel 10 and the groove 220 of the first lens 100 are capable of improving the positioning accuracy between the first lens 20 and the lens barrel 10. The step surfaces of the first lens 20, the second lens 40, and the third lens 50 are capable of improving the positioning accuracy between the first lens 20, the second lens 40, and the third lens 50. As a result, the imaging axes of the first lens 20, the second lens 40, and the third lens 50 are capable of aligning with the imaging axis 116 of the lens module 100 to improve performance of the lens module 100.

It will be understood that the above particular embodiments and methods are shown and described by way of illustration only. The principles and the features of the present disclosure may be employed in various and numerous embodiments thereof without departing from the scope of the present disclosure as claimed.

What is claimed is:

1. A lens module comprising:
a first lens comprising an imaging portion and a non-imaging portion surrounding the imaging portion, the non-imaging portion defining an annular conic surface;
an annular conic opaque plate contacting with the annular conic surface; and
a second lens comprising an imaging portion and a non-imaging portion surrounding the imaging portion, the object-side surface of the non-imaging portion being ladder-like shaped and comprising at least two step surfaces, and a junction of two adjacent step surfaces abutting against the opaque plate.

2. The lens module of claim 1, further comprising a lens barrel, wherein the first lens, the second lens, and the annular conic opaque plate are received in the lens barrel, the lens barrel comprises a main body and an annular aperture plate positioned at the object-side end of the main body, a first engaging portion is positioned on the inner surface of the annular aperture plate, a second engaging portion is positioned on the object-side surface of the non-imaging portion of the first lens, and the first engaging portion fittingly engages with the second engaging portion to locate the first lens on the inner surface of the aperture plate.

3. The lens module of claim 2, wherein the first engaging portion is a cylindrical-shaped protrusion, the second engaging portion is a cylindrical-shaped groove, and the protrusion is received in the groove.

4. The lens module of claim 2, wherein the annular aperture plate defines an aperture opening at the center thereof to allow light rays from objects of interest to enter the lens barrel.

5. The lens module of claim 4, wherein the aperture opening tapers towards the image-side of the lens barrel.

6. The lens module of claim 1, wherein the opaque plate is non-reflective.

7. The lens module of claim 1, wherein a flange bulges along the periphery of the non-imaging portion of the first lens, the annular conic surface extends from the flange to the imaging portion, the at least two step surfaces comprises a first step surface, and the first step surface is positioned on and contacts the flange of the first lens.

8. The lens module of claim 7, wherein the at least two step surfaces further comprises a second step surface and a third step surface, and a junction of the second step surface and the third step surface abuts against the opaque plate.

9. The lens module of claim 8, further comprising a third lens, the image-side surface of the non-imaging portion of the second lens is step-like shaped and comprises a fourth step surface and a fifth step surface, the object-side surface of the non-imaging portion of the third lens is step-like shaped and comprises a sixth step surface and a seventh step surface, the sixth step surface is shaped corresponding to the fourth step surface, the seventh step surface is shaped corresponding to the fifth step surface, the fourth step surface abuts against the sixth step surface, and the fifth step surface abuts against the seventh step surface.

10. The lens module of claim 9, wherein an adhesive layer is coated between the seventh step surface and the fifth step surface to firmly attach the third lens on the image-side surface of the non-imaging portion of the second lens.

11. The lens module of claim 10, wherein the adhesive layer is comprised of opaque materials.

12. A lens module, comprising:
a lens barrel defining an aperture opening;
a first lens received in the lens barrel and having an object-side surface and an image-side surface opposite to the object-side surface, the object-side surface being adjacent to the aperture opening, and the image-side surface having an annular conic surface;
a second lens received in the lens barrel; and
an annular opaque plate received in the lens barrel and sandwiched between the first and second lenses, the opaque plate contacting the annular conic portion.

13. The lens module of claim 12, wherein the first lens, the second lens and the annular opaque plate are substantially coaxially received in the lens barrel.

14. The lens module of claim 12, wherein the annular opaque plate is conic shaped and completely contacts the annular conic surface.

15. The lens module of claim 12, wherein the first lens comprises an imaging portion and a non-imaging portion surrounding the imaging portion, a flange bulges along the periphery of the non-imaging potion, the flange contacts the second lens, and the annular conic surface extends from the flange to the imaging portion.

16. The lens module of claim 15, wherein a first engaging is positioned on an inner surface of the lens barrel, a second engaging portion is positioned on the image-side surface of the first lens, and the first engaging portion engages with the second engaging portion to locate the first lens on the lens barrel.

17. The lens module of claim 15, wherein the second lens has an object-side surface and an image-side surface opposite to the object-side surface, the object-side surface comprises at least two step surfaces, and a junction of two adjacent step surfaces contacts the annular opaque plate.

18. The lens module of claim 17, wherein the at least two step surfaces comprises a first step surface, a second step surface and a third step surface, the first step surface contacts the flange, and a junction of the second step surface and the third step surface abuts against the annular opaque plate.

19. The lens module of claim 18, further comprising a third lens received in the lens barrel and contacting the image-side surface of the second lens.

20. The lens module of claim 19, wherein the second lens comprises a fourth step surface and a fifth step surface, the third lens comprises a sixth step surface and a seventh step surface, the fourth step surface contacts the sixth step surface, and the fifth step surface contacts the seventh step surface.

* * * * *